(12) United States Patent
Seo

(10) Patent No.: US 11,652,949 B2
(45) Date of Patent: May 16, 2023

(54) IMAGE READING APPARATUS AND IMAGE FORMING APPARATUS

(71) Applicant: CANON KABUSHIKI KAISHA, Tokyo (JP)

(72) Inventor: Shinichi Seo, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/879,623

(22) Filed: Aug. 2, 2022

(65) Prior Publication Data

US 2022/0377201 A1 Nov. 24, 2022

Related U.S. Application Data

(63) Continuation of application No. 17/207,448, filed on Mar. 19, 2021, now Pat. No. 11,431,875.

(30) Foreign Application Priority Data

Mar. 24, 2020 (JP) .............................. JP2020-052425

(51) Int. Cl.
*H04N 1/401* (2006.01)
*H04N 1/12* (2006.01)
*H04N 1/00* (2006.01)

(52) U.S. Cl.
CPC .......... *H04N 1/401* (2013.01); *H04N 1/0057* (2013.01); *H04N 1/00631* (2013.01); *H04N 1/00795* (2013.01); *H04N 1/125* (2013.01); *H04N 2201/0081* (2013.01)

(58) Field of Classification Search
USPC ......................................................... 358/474
See application file for complete search history.

(56) References Cited

U.S. PATENT DOCUMENTS

| | | | | |
|---|---|---|---|---|
| 5,455,690 | A * | 10/1995 | Ishikawa ............ | H04N 1/00718 358/461 |
| 9,204,007 | B2 * | 12/2015 | Maeda ............... | H04N 1/40056 |
| 10,477,051 | B2 * | 11/2019 | Sakuma ............... | H04N 1/4072 |
| 2013/0293934 | A1* | 11/2013 | Shinto ................ | H04N 1/00586 358/461 |
| 2018/0103168 | A1* | 4/2018 | Sakuma ............... | H04N 1/0066 |
| 2018/0198953 | A1* | 7/2018 | Misaka ................ | H04N 1/4076 |
| 2021/0306520 | A1* | 9/2021 | Seo ........................ | H04N 1/125 |

* cited by examiner

*Primary Examiner* — Negussie Worku
(74) *Attorney, Agent, or Firm* — Canon U.S.A., Inc. I.P. Division

(57) ABSTRACT

An image reading apparatus includes a stacking unit, a conveyance unit to convey stacked sheets, a reading unit, a white reference plate provided in a second position, and a processor. The reading unit is movable and, at a first position, reads a conveyed sheet image to obtain image data and, at the second position, reads the white reference plate. The processor generates, based on a plate reading result, a shading correction value and corrects the image data using the shading correction value. Based on whether the number of times in which reading the white reference plate has been performed is less than a predetermined number of times, the reading unit changes a time interval in a reading period that is from a first timing to a second timing. The processor generates, each time the white reference plate is read, the shading correction value based on the plate reading results.

9 Claims, 4 Drawing Sheets

IMAGE READING APPARATUS AND IMAGE FORMING APPARATUS

CROSS-REFERENCE TO RELATED APPLICATIONS

The present application is a continuation of U.S. patent application Ser. No. 17/207,448, filed on Mar. 19, 2021, which claims priority from Japanese Patent Application No. 2020-052425, filed Mar. 24, 2020, which are hereby incorporated by reference herein in their entireties.

BACKGROUND

Field

The present disclosure relates to an image reading apparatus configured to read an image formed on a sheet and an image forming apparatus having the image reading apparatus.

Description of the Related Art

An image forming apparatus, such as a copying machine, a facsimile machine, and a multifunction apparatus, is equipped with an image reading apparatus to read an image formed on an original. In the image reading apparatus, the original is placed on a platen with its reading surface, on which the image is formed, facing down. The image reading apparatus includes the reading unit to read the image of the original placed in the platen.

The reading unit includes a light source to irradiate an image reading surface of the original with light. The reading unit also includes a reading sensor to receive reflected light from the reading surface and photoelectrically converts the received reflected light to generate an electric signal representing the image of the original. The image reading apparatus generates image data which represents the image of the original based on the electric signal.

In a copy process, the image forming apparatus prints the image of the original on a sheet based on the image data generated by the image reading apparatus. When checking the quality of the image printed on the sheet, the image forming apparatus reads the sheet by the image reading apparatus and detects a printing position, magnification, distortion, color reproductivity, and the like from the reading result. The image forming apparatus maintains the quality of the image by adjusting printing conditions and the like according to the detection result.

To maintain the image quality, the image reading apparatus performs shading correction to adjust for non-uniformity in a main scanning direction of luminance of each pixel caused by the light source or the reading sensor of the reading unit. The shading correction is a process of calibrating a light luminance level (white) and a dark luminance level (black) based on the reading result of a plate to be a reference of white (white reference plate). The shading correction is performed in a color mode and a monochromatic mode, respectively. By performing the shading correction, the brightness of the image read by the image reading apparatus in the main scanning direction is corrected so that the brightness becomes uniform on average.

Specifically, the image reading apparatus reads the white reference plate with the light source turned off to obtain a black level shading correction value, and reads the white reference plate with the light source turned on to obtain a white level shading correction value. The image reading apparatus performs, using two shading correction values for the white level and the black level, the shading correction for correcting a black level and a white level of the image data of the read image at the time of image reading.

The non-uniformity of the brightness of each pixel in the main scanning direction changes depending on the temperature change of the reading unit such as the reading sensor and the light source. That is, an appropriate shading correction value in shading correction differs depending on the temperature of the reading unit. As a result, it is difficult to perform the shading correction with high accuracy due to a temperature change of the reading unit such as the reading sensor or the light source. Therefore, Japanese Patent Application Laid-Open No. 2018-74516 describes an image reading apparatus which detects an amount of the temperature change of the reading unit to perform the shading correction according to the detected amount of the temperature change.

In the image reading apparatus described in Japanese Patent Application Laid-Open No. 2018-74516, a sensor for detecting the amount of the temperature change of the reading unit is required. Further, the image reading apparatus described in Japanese Patent Application Laid-Open No. 2018-74516 requires a memory to store a shading correction value according to the temperature characteristics of the reading unit. Due to the sensor and memory, the cost of the image reading apparatus increases.

SUMMARY

According to an aspect of the present disclosure, an image reading apparatus includes a stacking unit on which a plurality of sheets are to be stacked, a conveyance unit configured to convey the plurality of sheets stacked on the stacking unit one by one, a reading unit configured to be movable in a predetermined direction and, at a first position in the predetermined direction, to read an image of a sheet to obtain image data, wherein the sheet conveyed by the conveyance unit, a white reference plate provided in a second position which is different from the first position in the predetermined direction, and one or more processors configured to perform operations including: reading, by the reading unit, the white reference plate at the second position in the predetermined direction, generating, based on a result of reading the white reference plate, a shading correction value to be used for shading correction, correcting the image data using the shading correction value, wherein, based on whether or not the number of times in which processes of reading the white reference plate has been performed is less than a predetermined number of times, the reading unit is configured to change a time interval between the processes of reading the white reference plate in a reading period, wherein the reading period is a period from a first timing at which reading of images of the plurality of sheets is started to a second timing at which the reading of the images of the plurality of sheets is completed, and generating, each time the reading unit reads the white reference plate, the shading correction value based on results of reading the white reference plate by the reading unit.

Further features of the present disclosure will become apparent from the following description of exemplary embodiments (with reference to the attached drawings).

DESCRIPTION OF THE EMBODIMENTS

In the following, an embodiment of the present disclosure is described in detail with reference to the accompanying drawings. In an example, an image reading apparatus performs shading correction with high accuracy while suppressing an increase in the cost of the image reading apparatus.

Configuration of the Image Reading Apparatus

Figure 1:
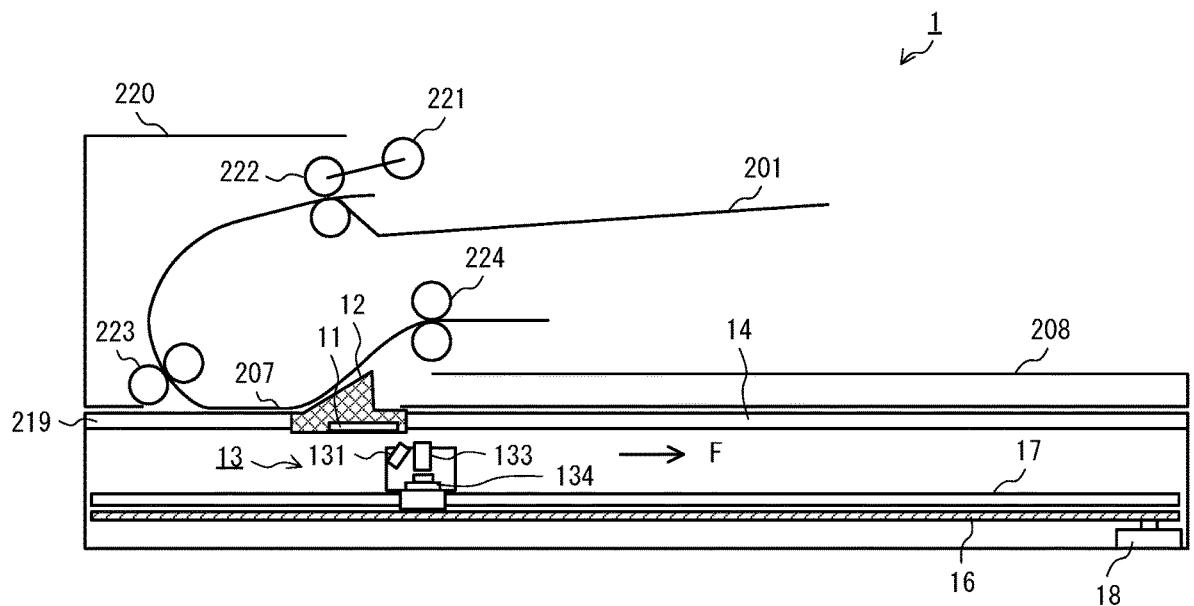
FIG. 1 is a configuration diagram of an image reading apparatus.

FIG. 1 is a configuration diagram of an image reading system. An image reading apparatus 1 of the present embodiment includes a CIS (Contact Image Sensor) unit 13 as a reading unit, a platen 14, and an automatic document feeder (hereinafter referred to as "ADF") 220. The image reading apparatus 1 reads an image from the original placed on the platen 14 by the CIS unit 13 or, or reads an image from the original conveyed by the ADF 220. The original is placed on the platen 14 with the image reading surface, on which the image has been formed, facing toward the platen 14. The ADF 220 feeds the original one by one to pass through a reading position of the CIS unit 13. The ADF 220 is provided to be openable and closable with respect to the platen 14. Further, the ADF has a function as a platen cover which suppresses the original placed on the platen 14.

The CIS unit 13 irradiates the original with light and receives reflected light of the irradiated light reflected from the original. The CIS unit 13 photoelectrically converts the received reflected light to generate an electric signal. The image reading apparatus 1 reads an image of the original by generating image data representing the image of the original based on the electric signal generated by the CIS unit 13.

The CIS unit 13 is arranged to be in close contact with the platen 14 on a side opposite to a surface of the platen 14 on which the original is placed. The CIS unit 13 includes an illumination unit 131 as a light source, an optical lens 133, and an imaging unit 134 as a reading sensor. The illumination unit 131 includes a white color type light guide tube, which includes a red LED (Light Emitting Diode), a green LED, and a blue LED and irradiates the original with light from a direction inclined by a predetermined angle with respect to the platen 14. The optical lens 133 consists of a Selfoc (R) lens or the like. The optical lens 133 forms an image of the light (reflected light) irradiated from the illumination unit 131 and reflected by the image reading surface on the light receiving surface of the imaging unit 134. The imaging unit 134 reads the reflected light from the original at the same magnification.

The imaging unit 134 consists of a plurality of photoelectric conversion elements and the like, and images the original image with the reflected light, which forms the image on the light receiving surface through the optical lens 133. In the present embodiment, the imaging unit 134 is a CMOS sensor, however, the imaging unit 134 may be a CCD sensor. The imaging unit 134 outputs an electric signal obtained by photoelectrically converting the reflected light. A plurality of photoelectric conversion elements are arranged in the depth direction of FIG. 1. Therefore, the CIS unit 13 reads the image of the original line by line with the depth direction of FIG. 1 as the main scanning direction.

The CIS unit 13 is arranged on a guide rail 17 and mounted on a drive belt 16. A scanner motor 18 is connected to the drive belt 16. The driving force of the scanner motor 18 is transmitted to the drive belt 16. The drive belt 16 can move the CIS unit 13 along the guide rail 17 in a sub scanning direction, which is a direction orthogonal to the main scanning direction (direction shown as arrow F), according to the driving force from the scanner motor 18. When reading the original image placed on the platen 14, the CIS unit 13 performs an image reading process line by line while moving toward the sub-scanning direction. Generally, as the scanner motor 18, a stepping motor, a DC motor, and the like is used.

The image reading apparatus 1 is provided with a white reference plate 11, which is read at the time of shading correction, and a flow reading glass plate 219, above which the original conveyed by the ADF 220 passes. The white reference plate 11 is arranged between the platen 14 and the flow reading glass plate 219. At the time of image reading, the CIS unit 13 reads the white reference plate 11 in order to generate a shading correction value, which is used for shading correction. On a side of the white reference plate 11 where the flow reading glass plate 219 is placed, an abutment plate 12, to which the original arranged on the platen 14 is abutted at a tip reference position, is mounted. The abutment plate 12 is arranged on an upper surface of the platen 14.

The ADF 220 includes an original tray 201, a conveyance path along which the original is conveyed, and a discharge tray 208. The ADF 220 feeds the original one by one from the original tray 201 to the discharge tray 208 via the transport path. One or more original can be stacked on the original tray 201. A pickup roller 221, a separation roller 222, a conveyance roller 223, and a discharge roller 224 are provided in the transport path. The pickup roller 221 and the separation roller 222, the conveyance roller 223, and the discharge roller 224 are driven by an original conveyance motor (not shown).

The pickup roller 221 moves the original from the original tray 201 to the conveyance path. The separation roller 222 separates the original which is moved to the conveyance path one by one to convey it toward the conveyance roller 223. The conveyance roller 223 conveys the conveyed original to the discharge roller 224 via the flow reading glass plate 219. When reading the original image using the ADF 220, the CIS unit 13 is positioned directly below the reading position 207 and reads the image line by line from the original which passes through the reading position 207. The discharge roller 224 discharges the original which has passed the reading position 207 to the discharge tray 208. When reading the original image using the ADF 220, the CIS unit 13 reads the white reference plate 11 before reading the image of the original in order to generate a shading correction value used for the shading correction.

Controller

Figure 2:
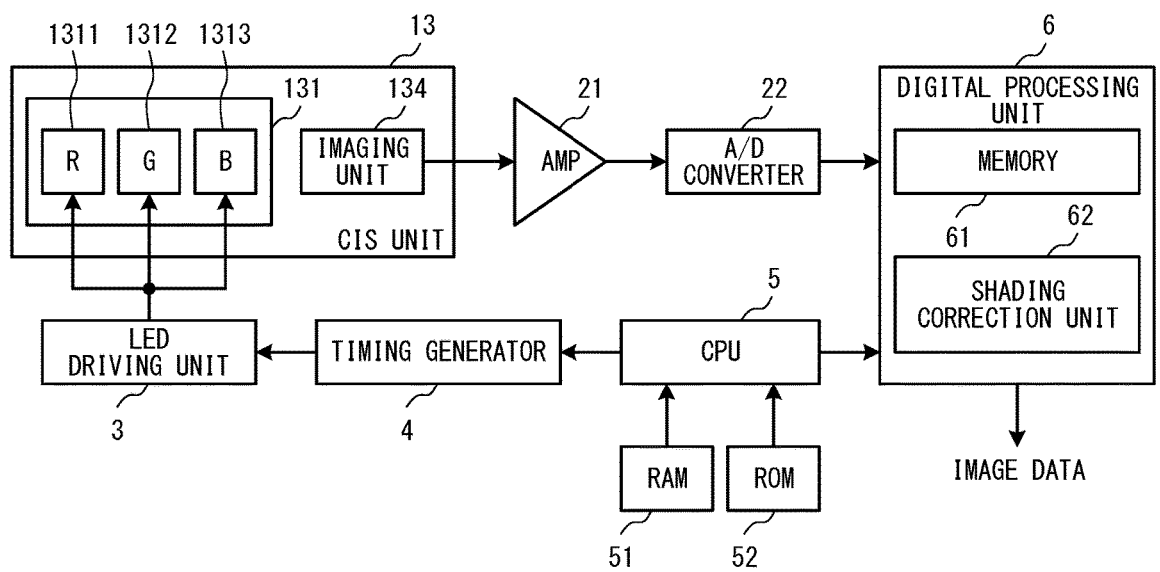
FIG. 2 is an exemplary diagram of a controller.

FIG. 2 is an explanatory diagram of a controller to control an operation of the image reading apparatus 1. The controller is installed in the image reading apparatus 1. The controller includes an amplifier 21, an A/D converter 22, an LED driving unit (driver) 3, a timing generator 4, a CPU (Central Processing Unit) 5, and a digital processing unit 6.

The image reading apparatus 1 performs the image reading process in response to an instruction obtained from an external device via an interface. Further, the image reading apparatus 1 performs the image reading process in response to a user operation input via an operation unit (not shown). The operation unit is a user interface which includes an input device such as an input key and a touch panel, and an output device such as a display and a speaker. On the display, a notification of a status of the image reading apparatus 1 and a message to guide the user to input an input operation are displayed. The user can input necessary instructions by operating the input key and the touch panel.

A RAM (Random Access Memory) 51 and a ROM (Read Only Memory) 52 are connected to the CPU 5. The CPU 5 controls the operation of the image reading apparatus 1 by performing a computer program stored in the ROM 52. The RAM 51 provides a work area when the CPU 5 performs processing. The CPU 5 controls the operation of the CIS unit 13 via the timing generator 4 and the LED driving unit 3. The CPU 5 controls the operation of the digital processing unit 6 to output the image data and the like.

The timing generator 4 transmits a control signal for controlling light emission from the illumination unit 131 to the LED driving unit 3 according to the setting of the CPU 5, thereby enabling the light amount adjustment of the illumination unit 131. The timing generator 4 uses, for example, a PWM (Pulse Width Modulation) signal as a control signal. The timing generator 4 performs the light amount adjustment of the illumination unit 131 by changing the duty ratio of the PWM signal for each line of the main scanning direction.

The LED driving unit 3 controls the light emission from the illumination unit 131 of the CIS unit 13 in response to the control signal obtained from the timing generator 4. The LED driving unit 3 controls the illumination unit 131 to illuminate according to lighting time for performing the light amount adjustment of the illumination unit 131 for each line of the main scanning direction. The LED driving unit 3 uses, for example, a PWM signal as a driving signal of the illumination unit 131. A lighting time of the illumination unit 131 is controlled by the duty ratio of the PWM signal. Since the illumination unit 131 included a red LED 1311, a green LED 1312, and a blue LED 1313, the LED driving unit 3 transmits a drive signal to each LED and performs a lighting control for each LED. Thereby the illumination unit 131 adjusts a light emission timing, the light emission time, and a light amount The electric signal output from the imaging unit 134 of the CIS unit 13 is input to the amplifier 21. The amplifier 21 amplifies the obtained electric signal and inputs it to the A/D converter 22. The A/D converter 22 performs A/D conversion of the amplified electric signal, and outputs, for example, the image data which is a digital signal representing each pixel as a 16-bit luminance value. The electric signal for one line output by the CIS unit 13 is obtained by sequentially lighting the red LED 1311, the green LED 1312, and the blue LED 1313. The electric signal is sequentially input to the A/D converter line by line in synchronization with a main scanning synchronization signal. The A/D converter 22 transmits the image data to the digital processing unit 6.

The digital processing unit 6 performs various image processing on the image data obtained from the A/D converter 22. The digital processing unit 6 includes a memory 61 and a shading correction unit 62. The memory 61 stores the image data for which the image processing has been performed. The image data stored in the memory 61 may be transferred to an external device such as a printing device or a personal computer which is communicably connected to the image reading apparatus 1. For this reason, the image reading apparatus 1 includes a serial interface such as USB (Universal Serial Bus), and a network interface.

In addition to the image data, the memory 61 of the digital processing unit 6 stores the shading correction value, a reading operation time after the shading correction value has been obtained, and the number of times the shading correction value obtaining process is performed, and the like. The reading operation time after obtaining the shading correction value may be represented by a real time counting, or represented by the number of the read originals. The shading correction unit 62 of the digital processing unit 6 performs the shading correction on the image data representing the original image obtained from the A/D converter 22 based on the shading correction value stored in the memory 61. The digital processing unit 6 controls the timing of obtaining the shading correction value again according to the number of times the shading correction value obtaining process is performed and the reading operation time stored in the memory 61. The shading correction value stored in the memory 61 is updated every time the shading correction value obtaining process is performed. The shading correction for image data is always performed using the latest shading correction value.

Deviation of Reading Position

In a case where the image reading apparatus 1 continuously performs the reading operation, a temperature of the illumination unit 131 and the imaging unit 134 inside the CIS unit 13 rises. As a result, a substrate on which the illumination unit 131, the optical lens 133, and the imaging unit 134 are mounted expands, thus, the position of the imaging unit 134 with respect to the optical lens 133 in the initial state is different from the position of the imaging unit 134 with respect to the optical lens 133 after a continuous reading operation. This is because the coefficient of thermal expansion of the optical lens 133 is different from that of the substrate.

Figure 3:
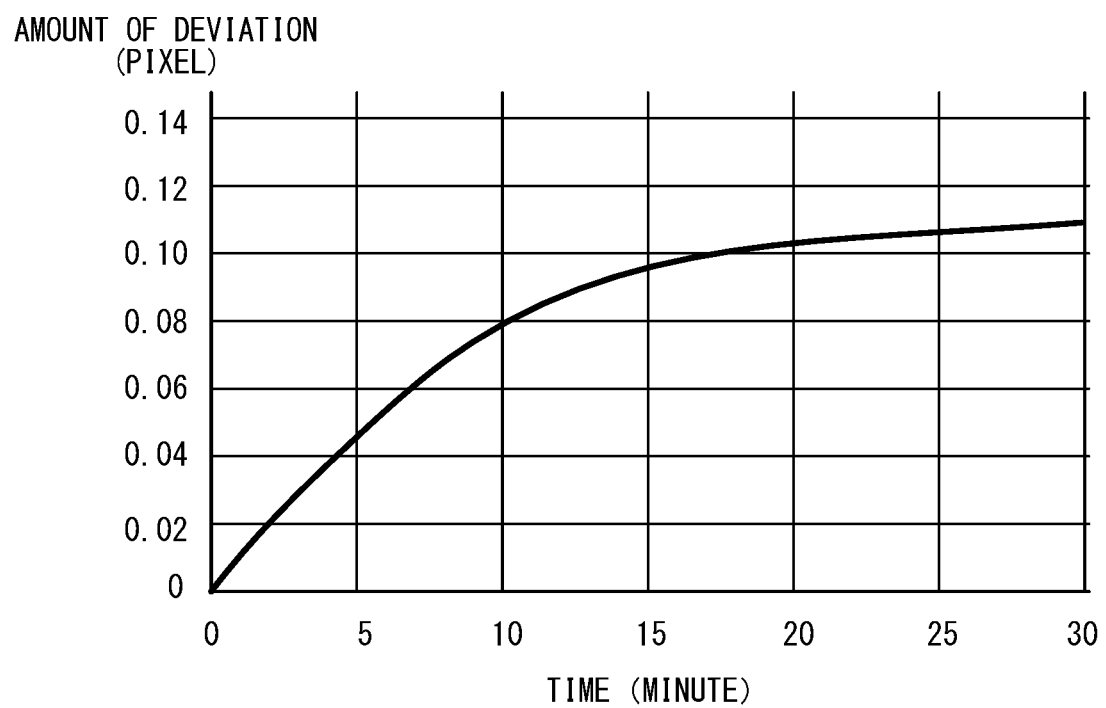
FIG. 3 is a graph representing a time change of an amount of deviation between a position where an imaging unit actually reads and a reading position.

FIG. 3 is a graph representing a time change of the position of the imaging unit 134 with respect to the optical lens 133 (an amount of deviation). The CIS unit 13 is in a state in which the temperature of the same continues to change significantly within a predetermined time after driving the CIS unit 13. For example, the temperature of the CIS unit 13 rises sharply while the elapsed time from the start of driving is less than about 20 minutes, and after 20 minutes or more from the start of the driving, the temperature of the CIS unit 13 stabilizes. The amount of deviation changes significantly until the temperature stabilizes. Therefore, the non-uniformity of the brightness of each pixel in the main scanning direction in the initial state differs from that of each pixel in the main scanning direction in the continuous reading operation.

In order to accommodate such a temperature change, the image reading apparatus 1 performs the obtaining process of the shading correction value at a predetermined interval while continuously performing the reading operation. When obtaining the shading correction value during operation, it is necessary to temporarily move the CIS unit 13 to the reading position of the white reference plate 11. During this, the conveyance of the original by the ADF 220 is temporarily interrupted. Therefore, from a viewpoint of productivity, it is preferable to reduce the number of times of the obtaining process of the shading correction value as much as possible. In the present embodiment, from the start of the reading operation until a predetermined time elapses, the shading correction value is obtained at a first time interval. Further, after the predetermined time elapses from the start of the reading operation, the shading correction value is obtained at a second time interval which is longer than the first time interval. It is noted that the predetermined time is longer than a time from the start of the reading operation to the time at which the temperature of the reading unit stabilizes.

It is noted that functions achieved by the CPU 5 may be achieved by an ASIC, a plurality of processors, or MPU(s).

The Image Reading Process

Figure 4:
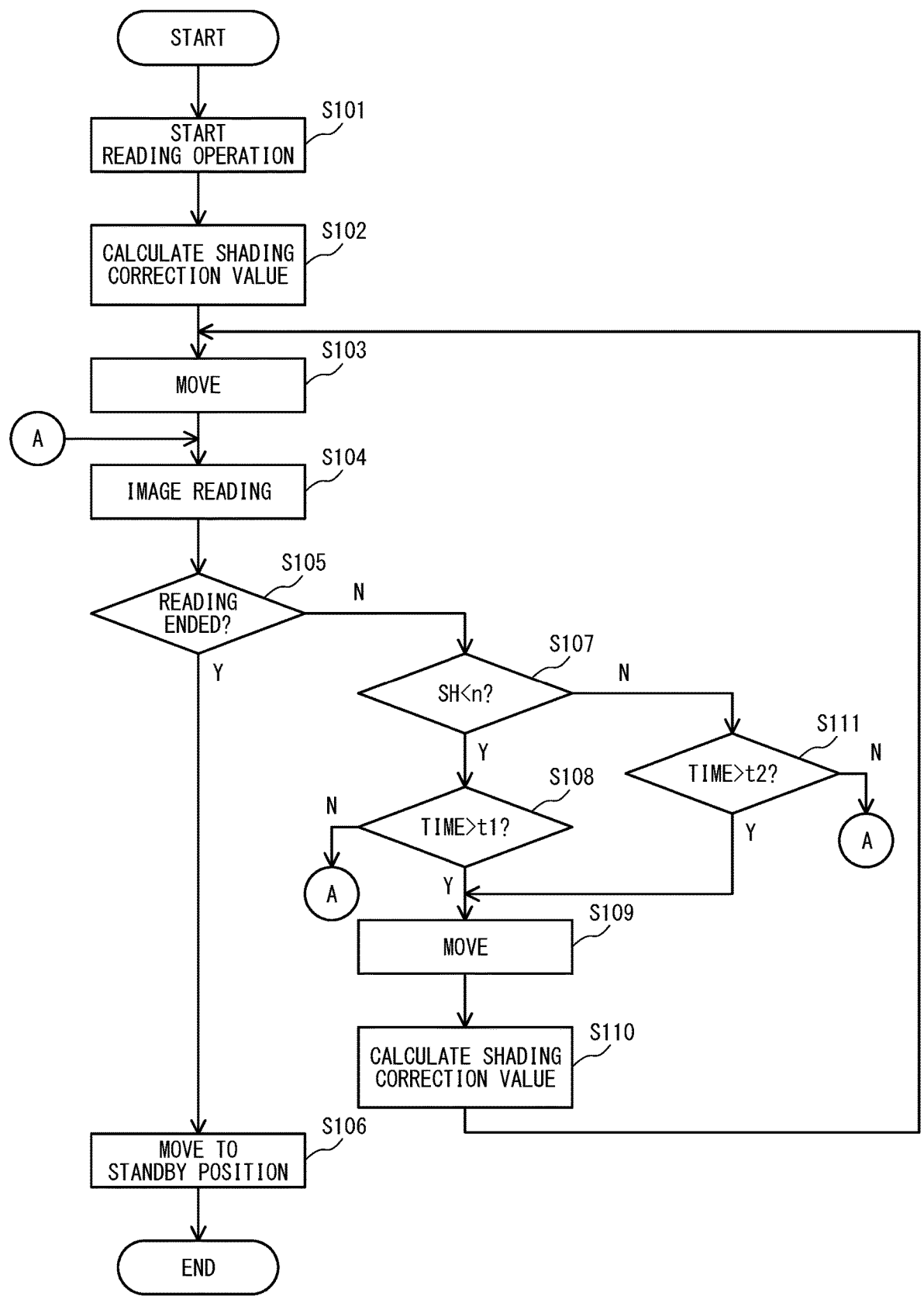
FIG. 4 is a flowchart illustrating an image reading process.

FIG. 4 is a flowchart illustrating the image reading process performed by the image reading apparatus 1. The CPU 5 performs the obtaining process of the shading correction value at the start of the image reading process and during the image reading process. This process is performed when the ADF 220 is used for continuously reading images from a plurality of the original images.

Upon receiving an image reading instruction from the external device or the operation unit, the CPU 5 starts the image reading operation (Step S101). The CPU 5, after starting the operation, performs the obtaining process of the shading correction value. Therefore, the CPU 5 controls the CIS unit 13 to read the white reference plate 11 by moving the CIS unit 13 directly under the white reference plate 11 by the scanner motor 18. The CPU 5 controls the digital processing unit 6 to calculate the shading correction value based on the reading result of the white reference plate 11 (Step S102). The shading correction value is stored in the memory 61. The CPU 5 counts the number of times the obtaining process of the shading correction value is performed. Further, the CPU 5 starts counting time immediately after the completion of the obtaining process of the shading correction value (reading operation time after obtaining the shading correction value).

The CPU 5, after calculating the shading correction value, controls the CIS unit 13 to move from a position directly below the white reference plate 11 to a position directly below the reading position 207 by the scanner motor 18 (Step S103). After moving the CIS unit 13 directly below the reading position 207, the CPU 5 controls the ADF 220 to move the original one by one from the original tray 201. The CPU 5 controls the CIS unit 13 to read the image of the original passing through the reading position 207 line by line. The reading result (electric signal) of the original image is transmitted from the CIS unit 13 to the digital processing unit 6 as image data via the amplifier 21 and the A/D converter 22. The digital processing unit 6 performs various digital image processing such as correction by the shading correction value on the image data, and stores the processed image data in the memory 61 (Step S104).

The CPU 5, after performing the image reading process of the original, determines whether or not the current original is the last original and thus the image reading process should be ended (Step S105). In a case where the image reading process of the last original has been ended (Step S105: Y), the CPU 5 moves the CIS unit 13 to a predetermined standby position by the scanner motor 18 and ends the process (Step S106).

When continuing the image reading process (Step S105: N), in order to correct an output fluctuation of the CIS unit 13 during the reading operation, the CPU 5 determines whether or not the number of times SH of the obtaining process of the shading correction value is performed is less than a predetermined number of times n (Step S107). In a case where the number of times SH of the obtaining process of the shading correction value is less than the predetermined number of times n (Step S107: Y), the CPU 5 determines whether or not the reading operation time from the obtaining process of the previous shading correction value is longer than t1, which indicates the first time interval (Step S108). When the reading operation time is equal to or shorter than the time t1 (Step S108: N), the CPU 5 performs the reading operation until the reading operation time becomes the time t1 or more.

When the reading operation time is longer than the time t1 (Step S108: Y), the CPU 5 determines to perform the obtaining process of the shading correction value to obtain a new shading correction value again. Therefore, the CPU 5 controls the CIS unit 13 to move just below the white reference plate 11 by the scanner motor 18 (Step S109). The CPU 5 controls the CIS unit 13 to read the white reference plate 11. The CPU 5 controls the digital processing unit 6 to calculate the shading correction value based on the reading result of the white reference plate 11 (Step S110). The newly calculated shading correction value is stored in the memory 61. The CPU 5 adds 1 to the number of times SH of the obtaining process of the shading correction value. Further, the CPU 5 clears the reading operation time, which has been counted immediately after the completion of the obtaining process of the previous shading correction value, and newly starts a real time counting of the reading operation time. The CPU 5, after calculating the shading correction value, controls the CIS unit 13 to move from the position directly below the white reference plate 11 to the position directly below the reading position 207 by the scanner motor 18, and continues the process until the image reading is completed.

In a case where the number of times SH of the obtaining process of the shading correction value is equal to or more than the predetermined number of times n (Step S107: N), the CPU 5 determines whether or not the reading operation time from the obtaining process of the previous shading correction value is longer than t2, which indicates the second time interval (Step S111). In a case where the reading operation time is equal to or shorter than the time t2 (Step S111: N), the CPU 5 performs the reading operation until the reading operation time becomes the time t2 or more.

When the reading operation time is longer than time t2 (Step S111: Y), the CPU 5 determines to perform the obtaining process of the shading correction value to obtain a new shading correction value again. Therefore, CPU5 performs again the obtaining process of the shading correction value by performing the process of S109 and S110. The CPU 5, after calculating the shading correction value, controls the CIS unit 13 to move from the position directly below the white reference plate 11 to the position directly below the reading position 207 by the scanner motor 18, and continues the process until the image reading is completed.

The predetermined number of times n is set based on the time to stabilize the amount of deviation explained in FIG. 3. Specifically, for example, it is set based on the quotient obtained by dividing the time required for stabilizing the amount of deviation (for example, 20 minutes) by the time t1. That is, in a case where the number of times SH of the obtaining process of the shading correction value becomes the predetermined number of times n or more, the amount of deviation explained in FIG. 3 becomes stable. On the other hand, when the number of times SH of the obtaining process of the shading correction value is less than the predetermined number of times n, the amount of deviation shown in FIG. 3 has a large fluctuation amount. In the present embodiment, in a case where the number of times SH of the obtaining process of the shading correction value is less than a predetermined number of times n, the obtaining process of the shading correction value is performed every time t1. In a case where the number of times SH of the obtaining process of the shading correction value is equal to or more than a predetermined number of times n, the obtaining process of the shading correction value is performed every time t2.

The time t1 is set assuming an initial state (a state in which the executing time of the image reading process is short) when continuously reading an image. In the initial state, the amount of deviation significantly fluctuates. The time t2 is set assuming a stable state in which the image reading process is continuously performed for a long time and the amount of deviation is stable. In the stable state, in which the amount of deviation is stable, the amount of deviation is small. In the present embodiment, an interval between the obtaining processes of the shading correction value is relatively shorter in the initial state where the fluctuation amount of the amount of deviation is significant, and the interval between the obtaining processes of the shading correction value is relatively longer in the stable state where the fluctuation amount of the amount of deviation is small.

As described above, when reading the original images continuously, the timing of performing the next obtaining process of the shading correction value is determined based on the reading operation time after performing the obtaining process of the shading correction value and the number of times SH of the obtaining process of the shading correction value. The time interval in performing the obtaining processes of the shading correction value in the stable state after the elapse of the predetermined time is longer than that in the initial state from the start of the operation until the elapse of the predetermined time. That is, in the initial state, in a case where the reading operation time after performing the obtaining process of the shading correction value becomes longer than the time t1, the obtaining process of the shading correction value is performed again. In the stable state, in a case where the reading operation time after performing the obtaining process of the shading correction value becomes longer than the time t2, which is longer than the time t1, the obtaining process of the shading correction value is performed again. Due to the above configuration, the shading correction can be performed with high precision, without using a sensor to detect the amount of the temperature change of the reading unit. That is, the shading correction can be performed with high accuracy while suppressing an increase in the cost of the image reading apparatus. In addition, it is possible to improve productivity by reducing unnecessary the obtaining process of the shading correction value.

Modification Example

Figure 5:
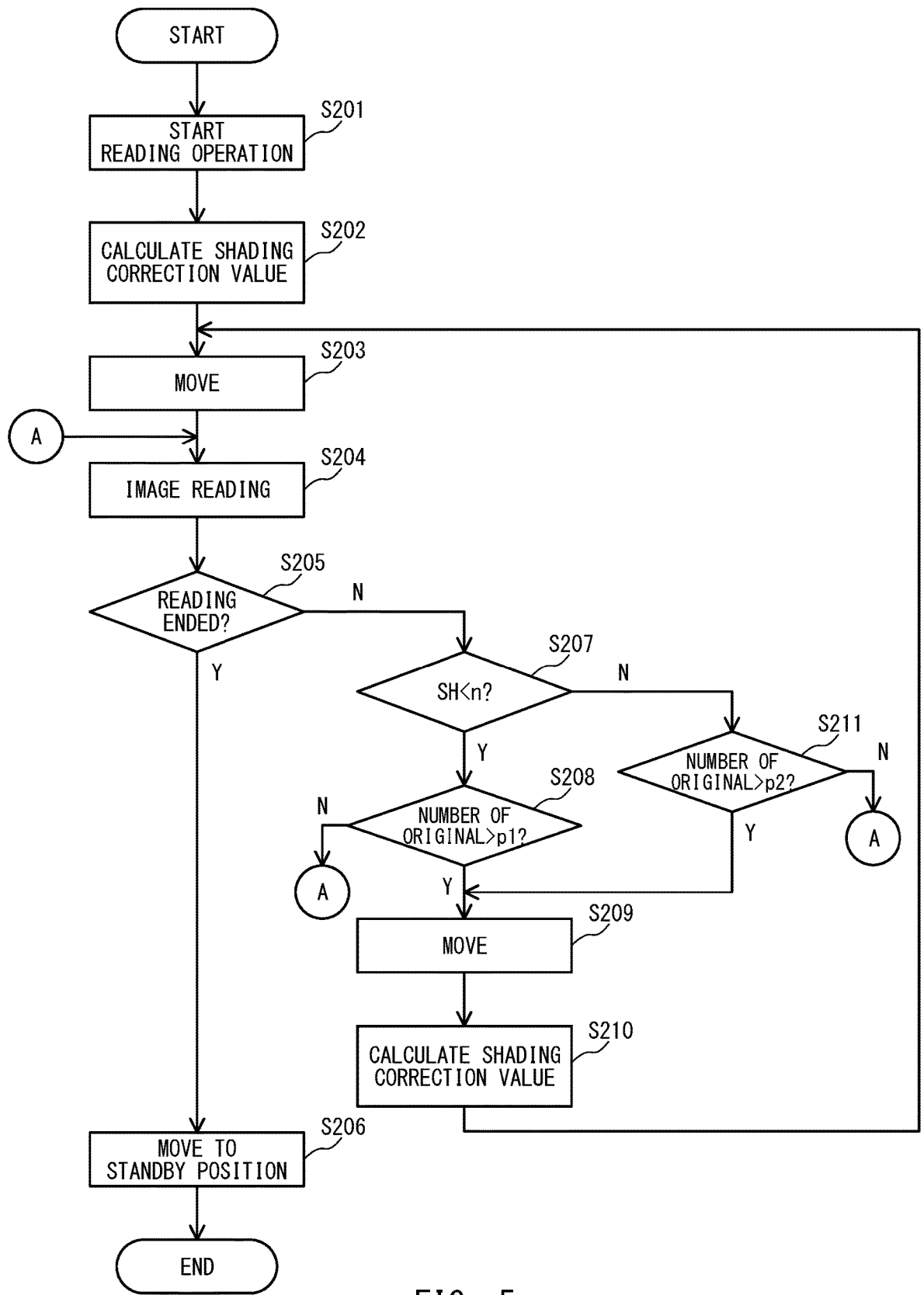
FIG. 5 is a flowchart illustrating another image reading process.

FIG. 5 is a flowchart illustrating another image reading process performed by the image reading apparatus. The CPU 5 performs the obtaining process of the shading correction value at the start and during the image reading process. This process is performed when using the ADF 220 to continuously read images from a plurality of the original images. In the process of FIG. 4, the CPU 5 determines whether or not to perform the obtaining process of the shading correction value based on the reading operation time after the shading correction value is obtained. On the other hand, in FIG. 5, CPU 5 determines whether or not to perform the obtaining process of the shading correction value based on the number of the originals from which the images are read (i.e., the number of the read originals) after the shading correction value is obtained.

Since the processes of Step S201 to Step S207 are similar to the processes of Step S101 to Step S107 in FIG. 4, the description thereof will be omitted. It is noted that the CPU 5 counts, immediately after the completion of the obtaining process of the shading correction value of Step S202, the number of the read originals in the process of Step S204. Each time the image is read from an original, The CPU 5 adds 1 to the number of the read originals.

In a case where the number of times SH of the obtaining process of the shading correction value is less than the predetermined number of times n (Step S207: Y), CPU 5 determines whether or not the number of the read originals after the previous obtaining process of the shading correction value is more than a first number of originals p1 (Step S208). In a case where the number of the read originals is equal to or less than the first number of originals p1 (Step S208: N), the CPU 5 performs the reading operation until the number of the read originals becomes equal to or more than the first number of originals p1.

When the number of the read originals is more than the first number of originals p1 (Step S208: Y), the CPU 5 determines to perform the obtaining process of the shading correction value again to obtain a new shading correction value. Therefore, the CPU 5 controls the CIS unit 13 to move just below the white reference plate 11 by the scanner motor 18 (Step S209). The CPU 5 controls the CIS unit 13 to read the white reference plate 11. The CPU 5 controls the digital processing unit 6 to calculate the shading correction value based on the reading result of the white reference plate 11 (Step S210). The newly calculated shading correction value is stored in the memory 61. The CPU 5 adds 1 to the number of times SH of the obtaining process of the shading correction value. Further, the CPU 5 clears the number of the read original, which has been counted immediately after the completion of the obtaining process of the previous shading correction value, and counts, immediately after the completion of the obtaining process of the shading correction value, the number of the originals from which the images are read. The CPU 5, after calculating the shading correction value, controls the CIS unit 13 to move from the position directly below the white reference plate 11 to the position directly below the reading position 207 by the scanner motor 18, and continues the process until the image reading is completed.

In a case where the number of times SH of the obtaining process of the shading correction value is equal to or more than the predetermined number of times n (Step S207: N), CPU 5 determines whether or not the number of the read originals after the previous obtaining process of the shading correction value is more than a second number of originals p2 (Step S211). In a case where the number of the read originals is equal to or less than the second number of originals p2 (Step S208: N), the CPU 5 performs the reading operation until the number of the read originals becomes equal to or more than the second number of originals p2.

When the number of the read originals is more than the second number of originals p2 (Step S211: Y), the CPU 5 determines to perform the obtaining process of the shading correction value again to obtain a new shading correction value. Therefore, CPU5 performs again the obtaining process of the shading correction value by performing the process of Step S209 and Step S210. The CPU 5, after calculating the shading correction value, controls the CIS unit 13 to move from the position directly below the white reference plate 11 to the position directly below the reading position 207 by the scanner motor 18, and continues the process until the image reading is completed.

The first number of the originals p1 is set assuming an initial state (a state in which the executing time of the image reading process is short) when continuously reading an image. In the initial state, the amount of deviation significantly fluctuates. The second number of the originals p2 is set assuming a stable state in which the image reading process is continuously performed for a long time and the amount of deviation is stable. In the stable state, in which the amount of deviation is stable, the amount of deviation is small. In the present embodiment, an interval between the obtaining processes of the shading correction value is relatively shorter in the initial state where the fluctuation amount of the amount of deviation is large, and the interval between the obtaining processes of the shading correction value is relatively longer in the stable state where the amount of deviation significantly fluctuates.

As described above, when reading the original images continuously, a timing of performing the next obtaining process of the shading correction value is determined based on the number of the originals which is read after performing the obtaining process of the shading correction value and the number of times SH of the obtaining process of the shading correction value. The time interval in performing the obtaining processes of the shading correction value in the stable state after the elapse of the predetermined time is longer than that in the initial state from the start of the operation until the elapse of the predetermined time. That is, in the initial state, in a case where the number of the originals which is read after performing the obtaining process of the shading correction value becomes more than the first number of the originals p1, the obtaining process of the shading correction value is performed again. In the stable state, in a case where the number of the originals which is read after performing the obtaining process of the shading correction value becomes more than the second number of the originals p2, which is more than the first number of the originals p1, the obtaining process of the shading correction value is performed again. Due to the above configuration, the shading correction can be performed with high precision, without using a sensor to detect the amount of the temperature change of the reading unit. That is, the shading correction can be performed with high accuracy while suppressing an increase in the cost of the image reading apparatus. In addition, it is possible to improve productivity by reducing an unnecessary obtaining process of the shading correction value.

In the above description, the image reading apparatus 1 alone has been described as an example. However, the present disclosure may be applied to a copying machine, a facsimile apparatus, a multifunction peripheral, and the like in which the above described image reading apparatus 1 and an image forming apparatus are used in combination. In a case where the image forming apparatus is the copying machine, the image forming apparatus forms an image on a sheet based on image data output from the image reading apparatus 1. The image forming apparatus may be an electrophotographic system or an inkjet printing system. The image reading apparatus 1 may be used for reading the original on which an image is formed by the image forming apparatus to detect printing accuracy.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image reading apparatus comprising:
   a conveyance unit configured to convey a sheet;
   a reading unit configured to read an image on the sheet conveyed by the conveyance unit to output an image reading result; and
   a white reference member configured to be read by the reading unit to output a member reading result for use in performing operations that include performing shading correction on the image reading result,
   wherein, in a case where the reading unit reads an image a plurality of sheets in an image reading period, the reading unit reads the white reference member in a first time interval in a first reading period included in the image reading period and reads the white reference member in a second time interval in a second reading period included in the image reading period, and
   wherein the second time interval is longer than the first time interval, and the second reading period is a period after the first reading period.

2. The image reading apparatus according to claim 1,
   wherein the first reading period is a period in which the number of times the reading unit has read the white reference member is less than a predetermined number of times, and
   wherein the second reading period is a period in which the number of times the reading unit has read the white reference member is greater than the predetermined number of times.

3. The image reading apparatus according to claim 1, further comprising a storing unit configured to store a shading correction value,
   wherein the performed operations further include updating the shading correction value stored in the storing unit upon generating a new shading correction value.

4. The image reading apparatus according to claim 1,
wherein the reading unit is configured to be movable in a predetermined direction and configured to read the image on the sheet conveyed by the conveyance unit at a first position in the predetermined direction,
wherein the white reference member is provided at a second position which is different from the first position in the predetermined direction, and
wherein the reading unit is configured to read the white reference member at the second position in the predetermined direction.

5. An image reading apparatus comprising:
a conveyance unit configured to convey a sheet;
a reading unit configured to read an image on the sheet conveyed by the conveyance unit to output an image reading result; and
a white reference member configured to be read by the reading unit to output a member reading result for use in performing operations that include performing shading correction on the image reading result,
wherein, in a case where the reading unit reads an image a plurality of sheets in an image reading period, the reading unit reads the white reference member every time the reading unit reads a first number of sheets included in the plurality of sheets in a first reading period included in the image reading period, and reads the white reference member every time the reading unit reads a second number of sheets included in the plurality of sheets in a second period included in the image reading period, and
wherein the second number of sheets is greater than the first number of sheets, and the second reading period is a period after the first reading period.

6. The image reading apparatus according to claim 5,
wherein the first reading period is a period in which the number of times the reading unit has read the white reference member is less than a predetermined number of times, and
wherein the second reading period is a period in which the number of times the reading unit has read the white reference member is greater than the predetermined number of times.

7. The image reading apparatus according to claim 5, further comprising a storing unit configured to store a shading correction value,
wherein the performed operations further include updating the shading correction value stored in the storing unit upon generating a new shading correction value.

8. The image reading apparatus according to claim 5,
wherein the reading unit is configured to be movable in a predetermined direction and configured to read the image on the sheet conveyed by the conveyance unit at a first position in the predetermined direction,
wherein the white reference member is provided at a second position which is different from the first position in the predetermined direction, and
wherein the reading unit is configured to read the white reference member at the second position in the predetermined direction.

9. An image reading apparatus comprising:
a conveyance unit configured to convey a sheet;
a reading unit configured to read an image on the sheet conveyed by the conveyance unit to output an image reading result; and
a white reference member configured to be read by the reading unit to output a member reading result for use in performing operations that include performing shading correction on the image reading result,
wherein, in a case where the reading unit reads an image a plurality of sheets in an image reading period, the reading unit reads the white reference member every time the reading unit reads a first number of pages in a first reading period included in the image reading period and reads the white reference member every time the reading unit reads a second number of pages in a second reading period included in the image reading period, and
wherein the second number of pages is greater than the first number of pages, and the second reading period is a period after the first reading period.

* * * * *